(12) United States Patent
Ho et al.

(10) Patent No.: US 7,667,640 B2
(45) Date of Patent: Feb. 23, 2010

(54) DETERMINING A GEOLOCATION SOLUTION OF AN EMITTER ON EARTH USING SATELLITE SIGNALS

(75) Inventors: Dominic K. C. Ho, Columbia, MO (US);
Jeffrey C. Chu, Los Altos, CA (US);
Michael L. Downey, Livermore, CA (US)

(73) Assignee: Glowlink Communications Technology, Inc., Los Altos, CA (US)

( * ) Notice: Subject to any disclaimer, the term of this patent is extended or adjusted under 35 U.S.C. 154(b) by 73 days.

(21) Appl. No.: 11/735,146

(22) Filed: Apr. 13, 2007

(65) Prior Publication Data
US 2008/0252516 A1    Oct. 16, 2008

(51) Int. Cl.
*H04B 7/185* (2006.01)
(52) U.S. Cl. ............. 342/357.01; 342/387; 342/357.05
(58) Field of Classification Search ............... 342/387, 342/357.01, 357.05
See application file for complete search history.

(56) References Cited

U.S. PATENT DOCUMENTS

| 3,747,095 | A * | 7/1973 | Wilson ...................... 342/356 |
|---|---|---|---|
| 5,008,679 | A | 4/1991 | Effland et al. |
| 5,594,452 | A | 1/1997 | Webber et al. |
| 5,973,643 | A | 10/1999 | Hawkes et al. |
| 6,018,312 | A | 1/2000 | Haworth |
| 6,618,009 | B2 | 9/2003 | Griffin et al. |
| 6,677,893 | B2 | 1/2004 | Rideout et al. |
| 6,876,859 | B2 | 4/2005 | Anderson et al. |
| 7,436,359 | B1 | 10/2008 | Rose |
| 7,453,400 | B2 | 11/2008 | Struckman et al. |
| 2002/0070889 | A1 * | 6/2002 | Griffin et al. ................. 342/353 |
| 2003/0117319 | A1 * | 6/2003 | Rideout et al. ............... 342/387 |
| 2004/0027276 | A1 | 2/2004 | Herman |
| 2004/0233100 | A1 | 11/2004 | Dibble et al. |
| 2008/0158059 | A1 | 7/2008 | Bull et al. |

OTHER PUBLICATIONS

K. C. Ho et al, *Solution and Performance Analysis of Geolocation by TDOA*, IEEE Transactions on Aerospace and Electronic Systems, Oct. 1993, pp. 1311-1322, vol. 29, No. 4.

K. C. Ho et al, *Geolocation of a Known Altitude Object From TDOA and FDOA Measurements*, IEEE Transactions on Aerospace and Electronic Systems, Jul. 1997, pp. 770-783, vol. 33, No. 3.

(Continued)

*Primary Examiner*—Thomas H Tarcza
*Assistant Examiner*—Fred H Mull
(74) *Attorney, Agent, or Firm*—Westberg Law Offices

(57) ABSTRACT

Embodiments provide systems and methods for determining the geolocation of an emitter on earth. A solution is obtained from two TDOA measurements that need not be acquired at the same time. A solution is obtained from a TDOA measurement and an FDOA measurement that need not be acquired at the same time and need not be coming from the same satellite pair. A location of an emitter can be determined from minimizing a cost function of the weighted combination of the six solutions derived from the two TDOA measurements and the two FDOA measurements, where the weight of each solution in the combination is determined based on the intersection angle of the two curves that define the possible locations of the emitter based on the TDOA and/or FDOA measurements.

26 Claims, 6 Drawing Sheets

OTHER PUBLICATIONS

Wade H. Foy, *Position-Location Solutions by Taylor-Series Estimation*, IEEE Transactions on Aerospace and Electronic Systems, Mar. 1976, pp. 187-193, vol. AES-12, No. 2.

Tim Pattison et al, *Sensitivity Analysis of Dual-Satellite Geolocation*, IEEE Transactions on Aerospace and Electronic Systems, Jan. 2000, pp. 56-71, vol. 36, No. 1.

PCT International Search Report and Written Opinion, PCT/US2008/060084, Jul. 7, 2008.

PCT International Search Report and Written Opinion, PCT/US2008/060077, Dec. 9, 2008.

* cited by examiner

DETERMINING A GEOLOCATION SOLUTION OF AN EMITTER ON EARTH USING SATELLITE SIGNALS

CROSS-REFERENCE TO RELATED APPLICATION(S)

This application is related to U.S. patent application No. 11/735,158, titled "Determining A Geolocation Solution Of An Emitter On Earth Based On Weighted Least-Squares Approximation," filed Apr. 13, 2007, which is hereby incorporated by reference in its entirety.

BACKGROUND OF THE INVENTION

1. Field of the Invention

This invention pertains to determining a geolocation for unknown emitters based on measurements of satellite signals.

2. Description of the Related Art

FIG. 1 shows a geolocation scenario 100 where an emitter 110 on the earth's surface 101 can be located using three satellites $s_1$, $s_2$, and $s_3$. The satellites $s_1$, $s_2$, and $s_3$ have non-zero velocities with respect to the earth. The unknown emitter 110 sends out signal 112 and it is received by the satellites $s_1$, $s_2$, and $s_3$. The satellites $s_1$, $s_2$, and $s_3$ relay the signal 114 to a ground station 120 or other observation point.

The ground station 120 computes the time-difference of arrival (TDOA), denoted as $d_{21}$, between the signal 112 from the emitter 110 through the primary satellite $s_1$ to the ground station 120 and the signal 112 from the emitter 110 through another satellite $s_2$ to the ground station 120. Similarly, the TDOA of the signal 112 from the emitter 110 through the first satellite $s_1$ to the ground station 120 and the signal 112 from the emitter 110 through a third satellite $s_3$ to the ground station 120 is also measured, which is denoted as $d_{31}$.

From a TDOA measurement and the locations of the two satellites used in the TDOA measurement, a three-dimensional curved surface can be derived that defines the possible locations of the emitter 110. The ground station 120 does not know precisely the positions and velocities of the satellites. A stationary reference emitter 130, whose position is known exactly, is used to reduce the effect of the position and velocity errors of the satellites on the part of the ground station 120 in the estimation of the emitter 110 location.

Previous theoretical work in this field, such as K. C. Ho and Y. T. Chan, "Geolocation of a known altitude object from TDOA and FDOA measurements," *IEEE Trans. Aerosp. Electron. Syst.*, vol. 33, pp. 770-783, July 1997 ("Ho and Chan"), which is incorporated herein by reference in its entirety, shows how to estimate the location of the emitter 110 by finding the intersection of two TDOA curves on the earth's surface. However, current techniques to find the location of the emitter 110 from two TDOA measurements assume that the two TDOA signals are acquired simultaneously. In practice, this is often not the case or not even possible. For example, the technical limitations of the equipment, including the limitations in the aperture of the receiving antennas of the ground station 120, may prevent two measurements from being acquired simultaneously. Also, in some situations, not all three of the satellites $s_1$, $s_2$, and $s_3$ are able to observe the same signal from the emitter 110 at the same time.

Alternatively, the location of an unknown emitter 110 can be found through measurements of the Doppler frequency shift in the received signals 114 at the ground station 120. Because the satellites $s_1$, $s_2$, and $s_3$ have non-zero velocities with respect to the earth, the received signals 114 at the ground station 120 relayed through the satellites $s_1$, $s_2$, and $s_3$ will be subject to Doppler frequency shift. This causes a frequency difference of arrival (FDOA) of the signals 112 relayed through satellite pair $s_1$ and $s_2$, denoted as $f_{21}$, and an FDOA of the signals 112 relayed through satellite pair $s_1$ and $s_3$, denoted as $f_{31}$. From an FDOA measurement and the locations of the two satellites used in the FDOA measurement, a three-dimensional curved surface can be derived that defines the possible locations of the emitter 110. Again, the ground station 120 does not know precisely the positions and velocities of the satellites. A stationary reference emitter 130, whose position is known exactly, is used to reduce the effect of the position and velocity errors of the satellites on the part of the ground station 120 in the estimation of the emitter 110 location. The location of an emitter 110 can be estimated by finding the intersection of the two FDOA curves on the earth's surface.

Further alternatively, some have suggested that the location of an unknown emitter 110 can be found using one TDOA measurement and one FDOA measurement. However, these solutions require that the signals to generate the TDOA and FDOA measurements be acquired at the same time and that they come from the same satellite pair. These conditions are often not fulfilled in practice.

Thus, there is a need for systems and methods of more accurately determining the location of an emitter. There is also a need to accurately determine the location of an emitter where the signals from different satellites are acquired at different times. Also, there is a need for systems and methods of accurately determining the location of an emitter where the TDOA measurement and an FDOA measurement do not necessarily come from the same satellite pair.

SUMMARY

Embodiments of the invention provide systems and methods for determining the geolocation of an emitter on earth using time-difference of arrival (TDOA) measurements from signals from three satellites that are not acquired at the same time. A virtual primary satellite location is used to determine the closed-form TDOA-TDOA solution to obtain an initial estimate of the emitter location. A Taylor-series technique is used to improve the solution estimate.

In another embodiments of the invention, the location of an emitter can be determined using one TDOA measurement and one frequency-difference of arrival (FDOA) measurement, wherein the TDOA and FDOA measurements are not required to come from signals acquired at the same time and are not necessarily coming from the same satellite pair. A virtual primary satellite location is used to determine the closed-form TDOA-FDOA solution to obtain an initial estimate of the emitter location. A Taylor-series technique is used to improve the solution estimate.

In another embodiment of the invention, the location of an emitter can be determined from the combination of the six solutions derived from the two TDOA measurements and the two FDOA measurements. From each measurement, a three-dimensional curved surface can be defined that represents the possible locations of the emitter. The intersection of any two of the curves at the earth's surface is a solution. Six solutions are determined based on all combinations of the four measurements. A weighting value for each solution is determined based on the intersection angle of the two curves that formed that solution. In one embodiment, the weighting values follow the general rule that the larger the intersection angle, the larger is the weighing value. The solutions and weighting values are combined to determine a cost function. The cost function is minimized to determine an accurate location of the emitter.

The present invention has various embodiments, including as a computer implemented process, as computer apparatuses, and as computer program products that execute on general or special purpose processors. The features and advantages described in this summary and the following detailed description are not all-inclusive. Many additional features and advantages will be apparent to one of ordinary skill in the art in view of the drawings, detailed description, and claims.

The figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE EMBODIMENTS

Figure 1:
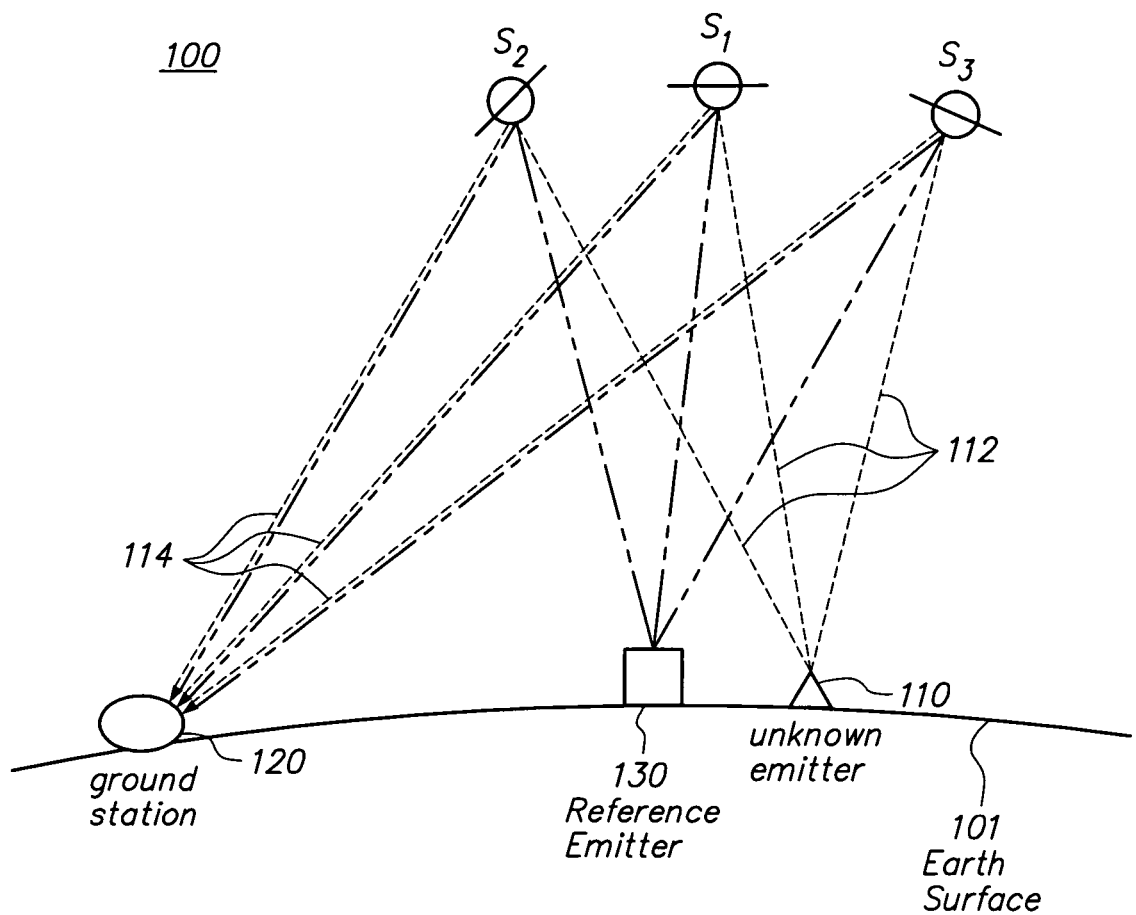
FIG. 1 illustrates the geolocation scenario where an emitter with an unknown location emits signals that are received at a ground station through three different satellites.

FIG. 1 illustrates the geolocation scenario 100 where an emitter 110 with an unknown location emits signals 112 that are received at an observer, referred to herein as a ground station 120, through three different satellites. As described above, the satellites $s_1$, $s_2$, and $s_3$ have non-zero velocities with respect to the earth. The unknown emitter 110 sends out signal 112 and it is received by the satellites $s_1$, $s_2$, and $s_3$. The satellites $s_1$, $s_2$, and $s_3$ relay the signal 114 to a ground station 120.

The ground station 120 determines the time-difference of arrival (TDOA), denoted as $d_{21}$, between the signal 112 from the emitter 110 through the primary satellite $s_1$ to the ground station 120 and the signal 112 from the emitter 110 through another satellite $s_2$ to the ground station 120. Similarly, the TDOA of the signal 112 from the emitter 110 through the first satellite $s_1$ to the ground station 120 and the signal 112 from the emitter 110 through a third satellite $s_3$ to the ground station 120 is also measured, which is denoted as $d_{31}$. Note that the signals 114 to obtain $d_{21}$ and $d_{31}$ are not acquired at the same time so that the positions of the satellites corresponding to $d_{21}$ and $d_{31}$ are not the same. Because the unknown emitter 110 is on earth, the intersection point of the two curves defined by $d_{21}$ and $d_{31}$ on the earth surface 101 forms an estimate of the emitter location.

As also described above, because the satellites $s_1$, $s_2$, and $s_3$ have non-zero velocities with respect to the earth, the received signals 114 at the ground station 120 relayed through the satellites $s_1$, $s_2$, and $s_3$ will be subject to Doppler frequency shift. This causes a frequency difference of arrival (FDOA) of the signals 112 relayed through satellite pair $s_1$ and $s_2$, denoted as $f_{21}$, and an FDOA of the signals 112 relayed through satellite pair $s_1$ and $s_3$, denoted as $f_{31}$. From an FDOA measurement and the locations of the two satellites used in the FDOA measurement, a three-dimensional curved surface can be derived that defines the possible locations of the emitter 110. Again, the ground station 120 does not know precisely the positions and velocities of the satellites. A stationary reference emitter, whose position is known exactly, is used to reduce the effect of the position and velocity errors of the satellites in the estimation of the emitter location. The location of an emitter 110 can be estimated by finding the intersection of the two FDOA curves on the earth's surface.

Within this framework, the TDOA and FDOA measurements can be related to the location of the unknown emitter. The position of the unknown emitter to be found is denoted as $u=[x,y,z]^T$. The true satellite positions and satellite velocities when the signals were acquired are denoted as $s_i^o=[x_i^o,y_i^o,z_i^o]^T$ and $\dot{s}_i^o=[\dot{x}_i^o,\dot{y}_i^o,\dot{z}_i^o]^T$ respectively, where i=1, 2, 3 represents the satellite number. $s_i^o$ and $\dot{s}_i^o$ are not known to the ground station, and only inaccurate satellite positions $s_i=s_i^o+\Delta s_i=[x_i,y_i,z_i]^T$ and velocities $\dot{s}_i=\dot{s}_i^o+\Delta \dot{s}_i=[\dot{x}_i,\dot{y}_i,\dot{z}_i]^T$ are available, where $\Delta s_i$ and $\Delta \dot{s}_i$ represent the errors in satellite positions and velocities. They are modeled as independent identical distributions (IID) with covariance matrices of $\Delta s_i$ equal to $\sigma_s^2 I$ and $\Delta \dot{s}_i$ equal to $\sigma_s^2 I$, where I is a 3 by 3 identity matrix. The position of the ground station is denoted as $g=[x_g,y_g,z_g]^T$. The Euclidean distance between the two vectors p and q shall be represented by $r_{p,q}=|p-q|$, and $\rho_{p,q}$ shall represent the unit vector given by $$\rho_{p,q} = \frac{(p-q)}{|p-q|}.$$

In one embodiment, the two TDOAs are related to the unknown emitter 110 position u as $$d_{21}(t_a) = \frac{1}{p}\left(\begin{array}{c} r_{u,s_2^o(t_a)} - r_{u,s_1^o(t_a)} + \\ r_{g,s_2^o(t_a)} - r_{g,s_1^o(t_a)} \end{array}\right) + b_{d,21}(t_a) + \varepsilon_{d,21} \quad (1)$$

Figure 2:
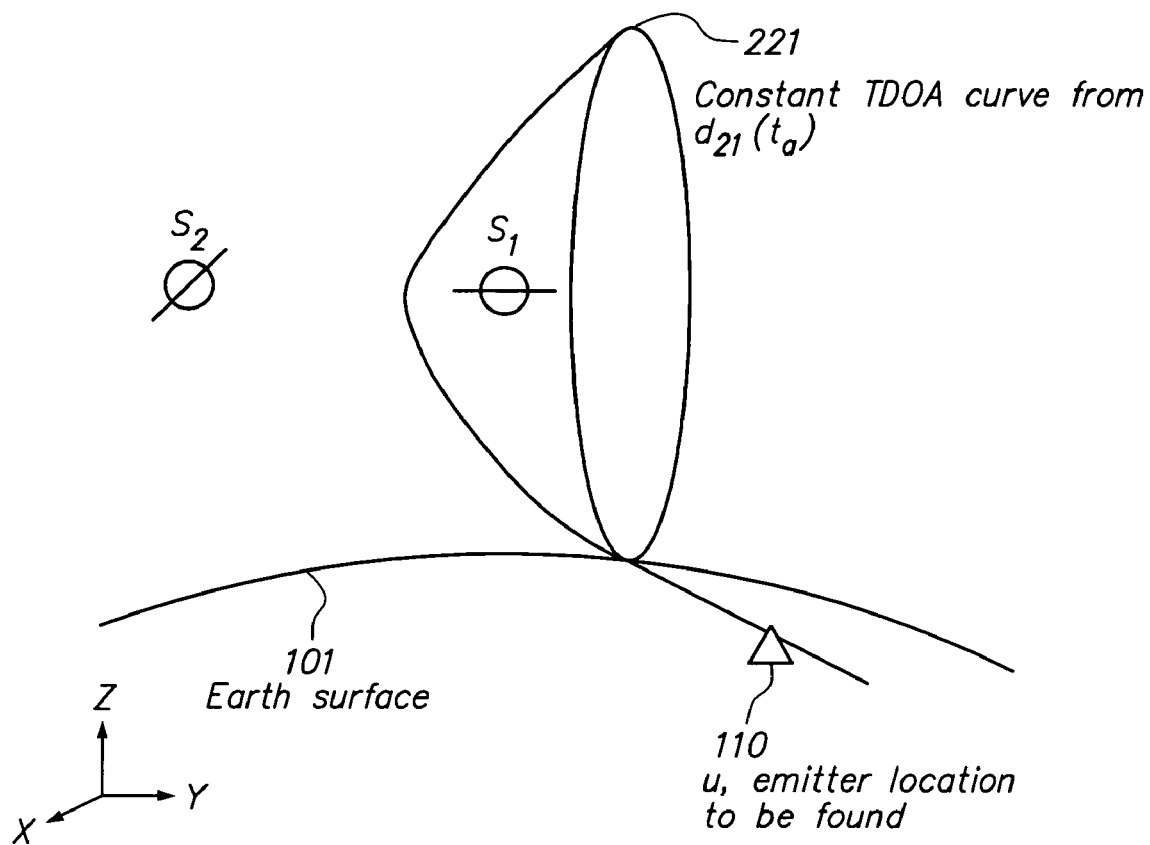
FIG. 2 illustrates an example of the shape of a TDOA curve derived from the time-difference of arrival between the signal from the emitter through the primary satellite $s_1$ to the ground station and the signal from the emitter through another satellite $s_2$ to the ground station, in accordance with one embodiment.

-continued $$d_{31}(t_b) = \frac{1}{p}\left( \begin{array}{l} r_{u,s_3^o(t_a)} - r_{u,s_1^o(t_b)} + \\ r_{g,s_3^o(t_a)} - r_{g,s_1^o(t_b)} \end{array} \right) + b_{d,31}(t_b) + \varepsilon_{d,31} \quad (2)$$

where $d_{21}(t_a)$ is the TDOA between the emitted signal relayed through the adjacent satellite $s_2$ and through the primary satellite $s_1$ at time $t_a$, and $d_{31}(t_b)$ is the TDOA between the emitted signal relayed by the adjacent satellite $s_3$ and by the primary satellite $s_1$ at time $t_b$. $t_a$ and $t_b$ are the time instances when the signals to generate the two TDOAs were collected, and in one embodiment $t_a$ is not equal to $t_b$. More specifically, in one embodiment, the time $t_a$ denotes the mid-point of the time-window during which the emitter signal relayed through satellite $s_1$ and satellite $s_2$ are measured, and time $t_b$ denotes the mid-point of the time-window during which the emitter signal relayed through satellite $s_1$ and satellite $s_3$ are measured. p is the signal propagation speed, $s_2^o(t_a)$ is the true position of the second satellite at time $t_a$, $b_{d,21}(t_a)$ and $b_{d,31}(t_b)$ denote the timing offset from the transponders in the satellites and other fixed bias errors, and $\varepsilon_{d,21}$ and $\varepsilon_{d,31}$ are the random measurement noise. $\varepsilon_{d,21}$ and $\varepsilon_{d,31}$ can have different powers, but in this example, they are assumed to have the same power equal to $\sigma_d^2$ for ease of illustration. Equation (1) defines a hyperbolic surface on which the emitter 110 is located. The left side of Equation (1) (i.e., $d_{21}(t_a)$) is determined from the measurement, and the right side indicates how $d_{21}(t_a)$ is related to the unknown position u of the emitter 110. Similarly, equation (2) defines another hyperbolic surface on which the emitter 110 is located, based on another TDOA measurement $d_{31}(t_b)$. FIG. 2 illustrates an example of the shape of a TDOA curve 221 derived from $d_{21}(t_a)$, in accordance with one embodiment.

The FDOAs are related to the unknown emitter 110 position u by $$f_{21}(t_c) = -\frac{f_o}{p}\left(\rho_{u,s_2^o(t_c)}{}^T \dot{s}_2^o(t_c) - \rho_{u,s_1^o(t_c)}{}^T \dot{s}_1^o(t_c)\right) - \quad (3)$$
$$\frac{1}{p}\left(f_{s_2}\rho_{g,s_2^o(t_c)}{}^T \dot{s}_2^o(t_c) - f_{s_1}\rho_{g,s_1^o(t_c)}{}^T \dot{s}_1^o(t_c)\right) + b_{f,21}(t_c) + \varepsilon_{f,21}$$

$$f_{31}(t_d) = -\frac{f_o}{p}\left(\rho_{u,s_3^o(t_d)}{}^T \dot{s}_3^o(t_d) - \rho_{u,s_1^o(t_d)}{}^T \dot{s}_1^o(t_d)\right) - \quad (4)$$
$$\frac{1}{p}\left(f_{s_3}\rho_{g,s_3^o(t_d)}{}^T \dot{s}_3^o(t_d) - f_{s_1}\rho_{g,s_1^o(t_d)}{}^T \dot{s}_1^o(t_d)\right) + b_{f,31}(t_d) + \varepsilon_{f,31}$$

where $f_{21}(t_c)$ is the FDOA between the emitted signal relayed by the adjacent satellite $s_2$ and by the primary satellite $s_1$ at time $t_c$, and $f_{31}(t_d)$ is the FDOA between the emitted signal 112 relayed by the adjacent satellite $s_3$ and by the primary satellite $s_1$ at time $t_d$. $t_c$ and $t_d$ are the time instances when the signals to obtain the two FDOAs are collected, and in one embodiment $t_c$ is not equal to $t_d$. More specifically, in one embodiment, the time $t_c$ denotes the mid-point of the time-window during which the emitter signal relayed through satellite $s_1$ and satellite $s_2$ are measured, and time $t_d$ denotes the mid-point of the time-window during which the emitter signal relayed through satellite $s_1$ and satellite $s_3$ are measured. $f_o$ is the uplink center frequency of the signal 114 received at the satellites, $f_{s_i}$ is the downlink center frequency from satellite $s_i$ to the ground station, i=1, 2, 3, p is the signal propagation speed, $b_{f,21}(t_c)$ and $b_{f,31}(t_d)$ account for the local oscillator (LO) offsets from the transponders in the satellites and other fixed bias errors, and $\varepsilon_{f,21}$ and $\varepsilon_{f,31}$ are the random measurement noise. $\varepsilon_{f,21}$ and $\varepsilon_{f,31}$ can have different powers, but in this example, they are assumed to have the same power equal to $\sigma_f^2$ for ease of illustration. Equations (3) and (4) define another two surfaces from the FDOA measurements on which the emitter 110 is located.

FIG. 1 also shows a reference emitter 130. Let $c=[x_c,y_c,z_c]^T$ be the location of the reference emitter 130 which will be used for calibration to reduce the effect of satellite position and velocity errors. When the TDOAs and FDOAs are obtained from the unknown emitter 110, a measurement is also made of the TDOAs and FDOAs from the calibration reference emitter 130 at the same instances so that ${}^c d_{21}(t_a)$, ${}^c d_{31}(t_b)$, ${}^c f_{21}(t_c)$ and ${}^c f_{31}(t_d)$ are also available. These expressions have the same forms as $d_{21}(t_a)$, $d_{31}(t_b)$, $f_{21}(t_c)$ and $f_{31}(t_d)$ given in equations (1)-(4), except that u is replaced by c and the random noises $\varepsilon_{d,21}$, $\varepsilon_{d,31}$, $\varepsilon_{f,21}$ and $\varepsilon_{f,31}$ are different. The calibration factors are then formed from ${}^c d_{21}(t_a)$, ${}^c d_{31}(t_b)$, ${}^c f_{21}(t_c)$ and ${}^c f_{31}(t_d)$ as $$C_{d,21}(t_a) = {}^c d_{21}(t_a) - \frac{1}{p}(r_{c,s_2(t_a)} - r_{c,s_1(t_a)}) \quad (5)$$

$$C_{d,31}(t_b) = {}^c d_{31}(t_b) - \frac{1}{p}(r_{c,s_3(t_b)} - r_{c,s_1(t_b)}) \quad (6)$$

$$C_{f,21}(t_c) = {}^c f_{21}(t_c) - \left(-\frac{{}^c f_o}{p}(\rho_{c,s_2(t_c)}{}^T \dot{s}_2(t_c) - \rho_{c,s_1(t_c)}{}^T \dot{s}_1(t_c))\right) \quad (7)$$

$$C_{f,31}(t_d) = {}^c f_{31}(t_d) - \left(-\frac{{}^c f_o}{p}(\rho_{c,s_3(t_d)}{}^T \dot{s}_3(t_d) - \rho_{c,s_1(t_d)}{}^T \dot{s}_1(t_d))\right) \quad (8)$$

where ${}^c f_o$ is the uplink center frequency from the calibration reference emitter 130.

The calibration factors are subtracted from the respective TDOAs and FDOAs of the unknown emitter 110 to minimize the effect of satellite position and velocity errors. The equations that are used to solve for the unknown emitter position are $$\tilde{d}_{21}(t_a) = d_{21}(t_a) - C_{d,21}(t_a) \quad (9)$$
$$= \frac{1}{p}(r_{u,s_2(t_a)} - r_{u,s_1(t_a)})$$

$$\tilde{d}_{31}(t_b) = d_{31}(t_b) - C_{d,31}(t_b) \quad (10)$$
$$= \frac{1}{p}(r_{u,s_3(t_b)} - r_{u,s_1(t_b)})$$

$$\tilde{f}_{21}(t_c) = f_{21}(t_c) - C_{f,21}(t_c) \quad (11)$$
$$= -\frac{f_o}{p}(\rho_{u,s_2(t_c)}{}^T \dot{s}_2(t_c) - \rho_{u,s_1(t_c)}{}^T \dot{s}_1(t_c))$$

$$\tilde{f}_{31}(t_d) = f_{31}(t_d) - C_{f,31}(t_d) \quad (12)$$
$$= -\frac{f_o}{p}(\rho_{u,s_3(t_d)}{}^T \dot{s}_3(t_d) - \rho_{u,s_1(t_d)}{}^T \dot{s}_1(t_d))$$

where the first lines in the above four equations are known quantities from measurements, and the second lines relate the known quantities to the unknown u to be found. Equations (9)-(12) represent equations (1)-(4) where the calibration factors obtained from equations (5)-(8) have been applied to reduce the effect of the errors in satellite positions and velocities.

Figure 3A:
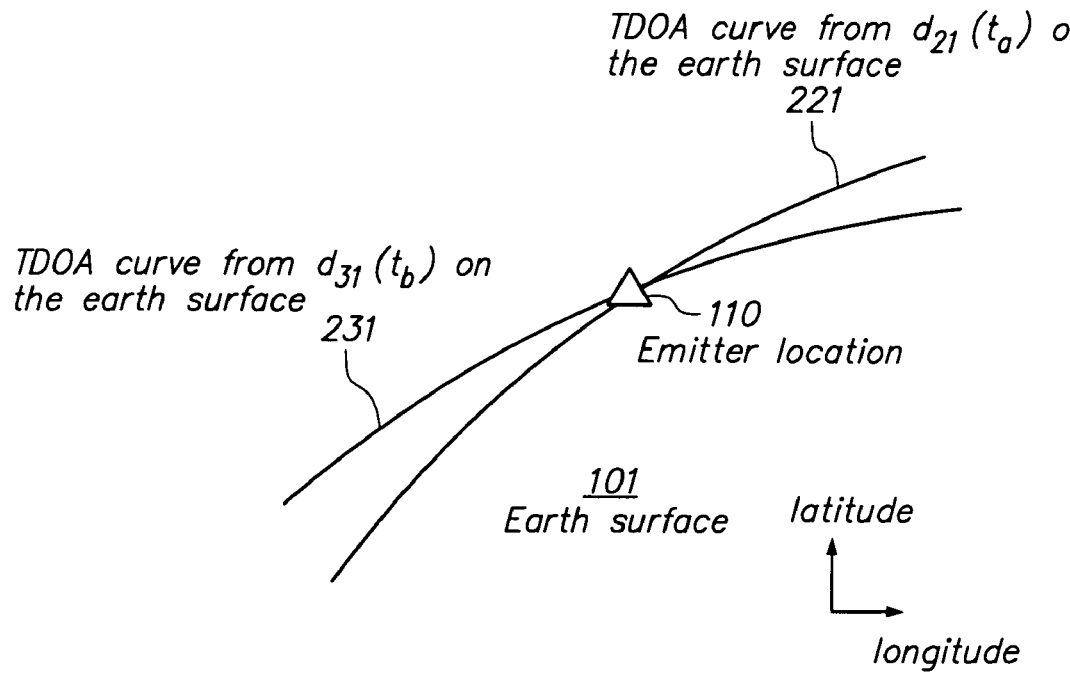
FIG. 3A illustrates an intersection of two TDOA curves on the earth's surface, in accordance with one embodiment.
Figure 3B:
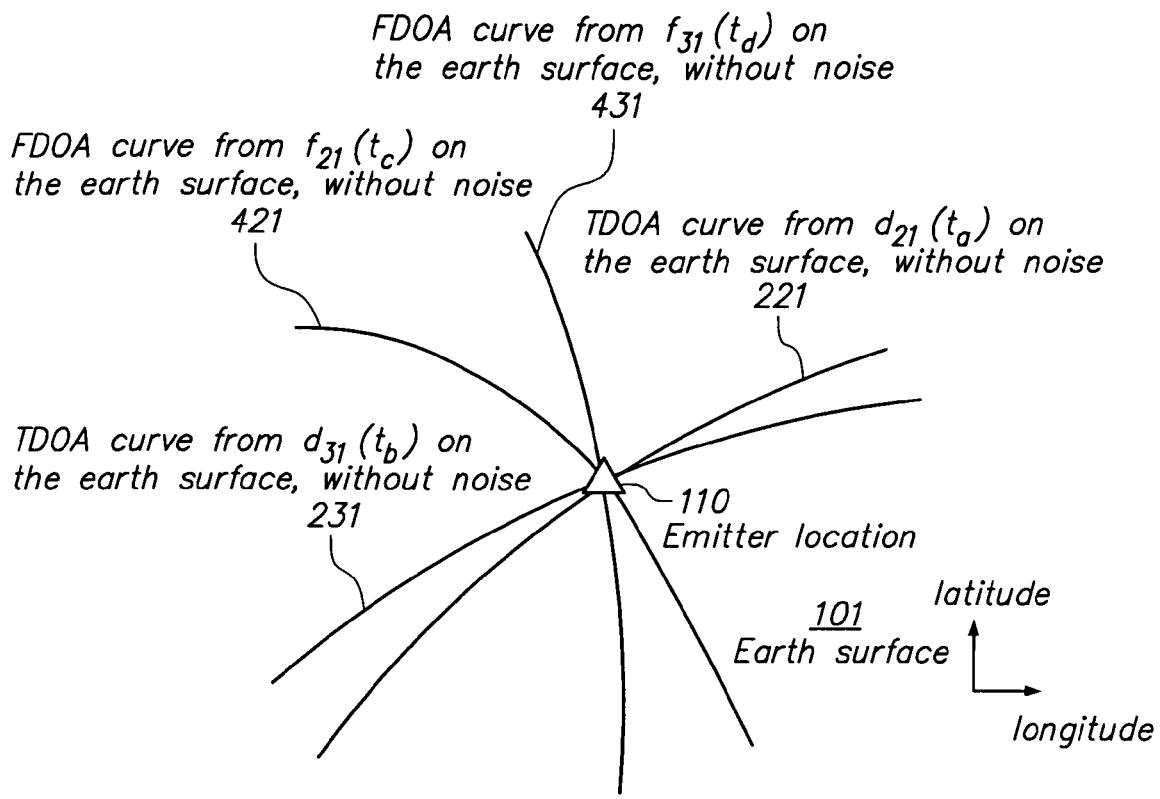
FIG. 3B illustrates an example intersection of two TDOA curves and two FDOA curves, where each of the curves is without noise, in accordance with one embodiment.

As discussed above, each of the equations (5)-(8) defines a surface on which the unknown emitter 110 is located according to the respective measurement. The intersection of the curves on the earth's surface is the estimate of the location of the unknown emitter 110. FIG. 3A illustrates an example of an intersection of two TDOA curves 221, 231 on the earth's surface, in accordance with one embodiment. FIG. 3B illustrates an example intersection of two TDOA curves 221, 231 and two FDOA curves 421, 431, where each of the curves is without noise or other error, in accordance with one embodiment. As shown in FIG. 3B, if the TDOA and FDOA measurements were without noise or other error, the corresponding curves 221, 231, 421, 431 would all intersect at one location that is the true location of the emitter 110.

Figure 5A:
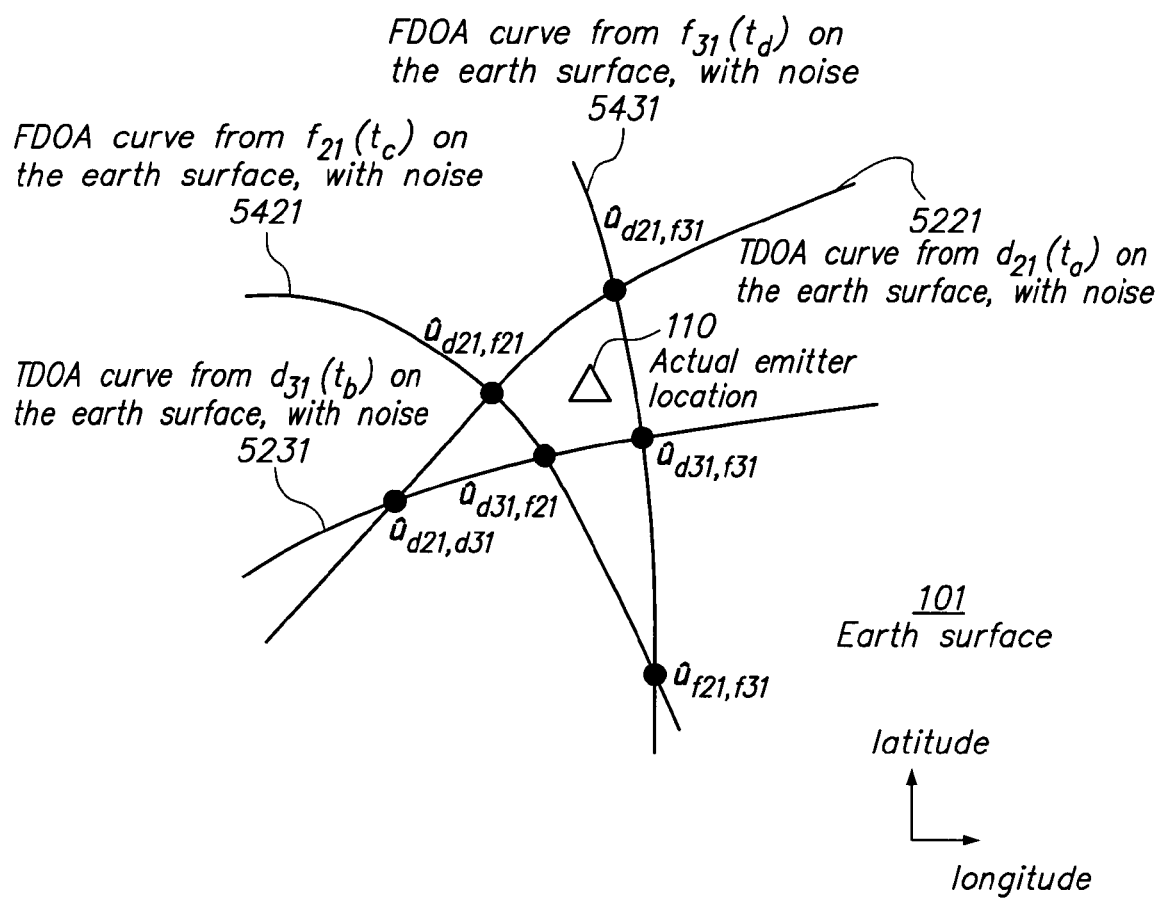
FIG. 5A illustrates an example that compares the actual emitter location to the points of intersection of two TDOA curves and two FDOA curves, wherein each curve includes noise, in accordance with one embodiment.

In real world applications, there will be some error, instrument noise, or other source of noise in TDOA and FDOA measurements. Thus, it is unlikely that the curves corresponding to the TDOA and FDOA measurements will intersect at one point on the earth's surface. FIG. 5A illustrates an example of the location to the points of intersection of two TDOA curves 5221, 5231 and two FDOA curves 5421, 5431, wherein each curve 5221, 5231, 5421, 5431, includes noise, in accordance with one embodiment. Thus, the intersection points of the curves are estimates of the emitter's 110 true location.

Figure 4:
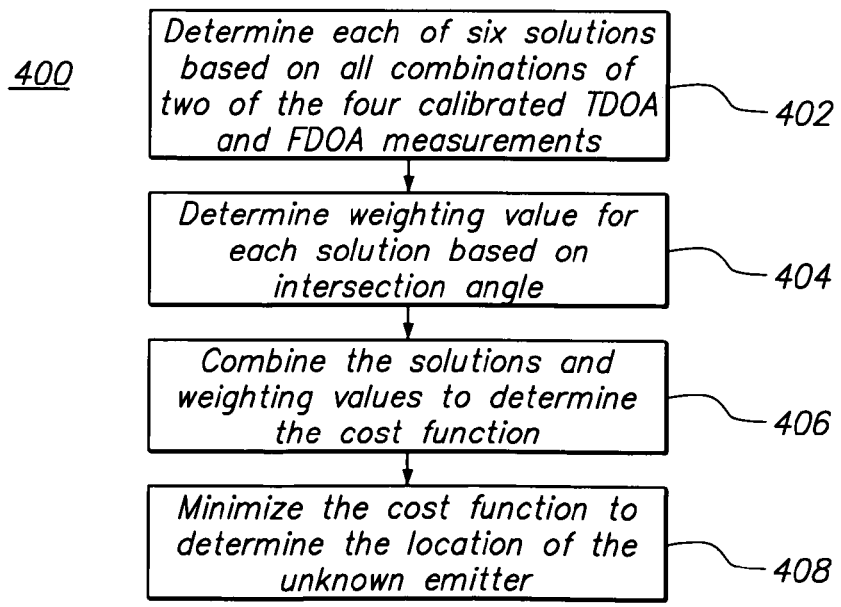
FIG. 4 is a flowchart of a method of determining a location of an emitter, in accordance with one embodiment.

FIG. 4 is a flowchart of a method 400 of determining a location of an emitter, in accordance with one embodiment. In step 402, each of the six solutions based on all combinations of two of the four calibrated TDOA and FDOA measurements are determined. The number of possible solutions from any combination of two measurements is six. The possible solutions are denoted as:

$\hat{u}_{d_{21},d_{31}}$: solution obtained from $d_{21}$ and $d_{31}$, using equations (9) and (10)

$\hat{u}_{d_{21},f_{21}}$: solution obtained from $d_{21}$ and $f_{21}$, using equations (9) and (11)

$\hat{u}_{d_{21},f_{31}}$: solution obtained from $d_{21}$ and $f_{31}$, using equations (9) and (12)

$\hat{u}_{d_{31},f_{21}}$: solution obtained from $d_{31}$ and $f_{21}$, using equations (10) and (11)

$\hat{u}_{d_{31},f_{31}}$: solution obtained from $d_{31}$ and $f_{31}$, using equations (10) and (12)

$\hat{u}_{f_{21},f_{31}}$: solution obtained from $f_{21}$ and $f_{31}$, using equations (11) and (12).

The solutions fall into three categories: TDOA-TDOA, TDOA-FDOA, and FDOA-FDOA. A method used to solve each category of solution in accordance with one embodiment is described below.

I. TDOA-TDOA Solution $\hat{u}_{d_{21},d_{31}}$

Traditional techniques to find the TDOA-TDOA solution $\hat{u}_{d_{21},d_{31}}$ requires that the signals to generate $d_{21}$ and $d_{31}$ are acquired at the same time, i.e. $t_a = t_b$. In practical applications, the signals are acquired at different times. The following TDOA-TDOA solution does not require or assume that the signals are acquired at the same time.

First, a virtual primary satellite location is designated as $$\check{s}_1 = \frac{1}{2}(s_1(t_a) + s_1(t_b)). \quad (13)$$

The virtual primary satellite location is used to determine the closed form TDOA-TDOA emitter 110 position solution according to the technique used by K. C. Ho and Y. T. Chan, "Geolocation of a known altitude object from TDOA and FDOA measurements," *IEEE Trans. Aerosp. Electron. Syst.*, vol. 33, pp. 770-783, July 1997 ("Ho and Chan"), which is incorporated herein by reference. Then the closed-form solution method described by Ho and Chan is applied by using $(\check{s}_1, s_2(t_a), s_3(t_b))$ as the three satellite positions and $(\tilde{d}_{21}(t_a), \tilde{d}_{31}(t_b))$ as the two TDOAs to obtain an initial estimate $\hat{u}^{(0)}$.

Then, the initial solution $\hat{u}^{(0)}$ is used in the Taylor-series technique described in W. H. Foy, "Position-location solutions by Taylor-series estimation," *IEEE Trans. Aerosp. Electron. Syst.*, vol. AES-12, pp. 187-194, March 1976 ("Foy"), which is incorporated herein by reference in its entirety, to improve the solution estimate by iterating for l=0, 1, 2, . . .

$$\Delta\hat{u}^{(l+1)} = \quad (14)$$

$$\left[\begin{pmatrix}\left(\frac{\partial r_{u,s_2(t_a)}}{\partial u} - \frac{\partial r_{u,s_1(t_a)}}{\partial u}\right)^T \\ \left(\frac{\partial r_{u,s_3(t_b)}}{\partial u} - \frac{\partial r_{u,s_1(t_b)}}{\partial u}\right)^T \\ u^T\end{pmatrix}_{u=\hat{u}^{(l)}}\right]^{-1}\begin{bmatrix}\tilde{d}_{21}(t_a) - \frac{1}{p}\left(r_{\hat{u}^{(l)},s_2(t_a)} - r_{\hat{u}^{(l)},s_1(t_a)}\right) \\ \tilde{d}_{31}(t_b) - \frac{1}{p}\left(r_{\hat{u}^{(l)},s_3(t_b)} - r_{\hat{u}^{(l)},s_1(t_b)}\right) \\ r_e^2 - \hat{u}^{(l)T}\hat{u}^{(l)}\end{bmatrix}$$

$$\hat{u}^{(l+1)} = \hat{u}^{(l)} + \Delta\hat{u}^{(l+1)} \quad (15)$$

until $|\Delta\hat{u}^{(l+1)}|$ is sufficiently small, for example 0.01 m, and $r_e$ is the earth radius around the location of the emitter 110. Equation (14) obtains the amount of correction of the emitter 110 location estimate in one embodiment. In practice, one to three iterations are sufficient in one embodiment. Equation (15) forms a better emitter 110 location estimate by adding the correction component computed from equation (14) to the solution.

II. TDOA-FDOA Solutions $\hat{u}_{d_{21},f_{21}}$, $\hat{u}_{d_{21},f_{31}}$, $\hat{u}_{d_{31},f_{21}}$ and $\hat{u}_{d_{31},f_{31}}$ Traditional techniques to find TDOA-FDOA solutions require that the signals to obtain TDOA and FDOA are acquired at the same time, and that the TDOA and FDOA are from the same pair of satellites. That means, for example, to use the techniques of Ho and Chan, it is required that $t_a = t_c$ when solving for the solution $\hat{u}_{d_{21},f_{21}}$ and $t_b = t_d$ when solving for the solution $\hat{u}_{d_{31},f_{31}}$. In practical applications, the TDOA and FDOA are often not able to be measured at the same instance in the three satellite system. Furthermore, the techniques of Ho and Chan do not disclose a method to obtain the solutions $\hat{u}_{d_{21},f_{31}}$ and $\hat{u}_{d_{31},f_{21}}$ because the TDOA and FDOA for these solutions come from two different pairs of satellites. The following TDOA-FDOA solution does not require or assume that the signals are acquired at the same time, and it can be used to solve for all four of the solutions $\hat{u}_{d_{21},f_{21}}$, $\hat{u}_{d_{21},f_{31}}$, $\hat{u}_{d_{31},f_{21}}$ and $\hat{u}_{d_{31},f_{31}}$.

In one embodiment of the present invention, the method of solving for the TDOA-FDOA solutions follows a similar approach as in the TDOA-TDOA solution discussed above. To find the solution from the pairs $(\tilde{d}_{i,1}, \tilde{f}_{j,1})$, where i,j=2 or 3. The first step is to form the virtual primary satellite location $$\check{s}_1 = \frac{1}{2}(s_1(\tau_i) + s_1(\tau_j)) \quad (16)$$

where $\tau_i = t_a$ if i=2 and $\tau_i = t_b$ if i=3, and $\tau_j = t_c$ if j=2 and $\tau_j = t_d$ if j=3. The virtual primary satellite location is used to determine the closed-form TDOA-FDOA emitter 110 position solution according to the technique used by Ho and Chan. The closed-form solution from Ho and Chan is applied by using $(\check{s}_1, s_i(\tau_i), s_j(\tau_j))$ as the three satellite positions and $(\tilde{d}_{i1}(\tau_i), \tilde{f}_{j1}(\tau_j))$ as the TDOA and FDOA to obtain an initial estimate $\hat{u}^{(0)}$.

Then, the initial solution $\hat{u}^{(0)}$ is used in the Taylor-series technique described by Foy to improve the solution estimate by iterating for l=0, 1, 2, . . .

$$\Delta \hat{u}^{(l+1)} = \quad (17)$$

$$\begin{bmatrix} \frac{1}{p}\left(\frac{\partial r_{u,s_i(\tau_i)}}{\partial u} - \frac{\partial r_{u,s_1(\tau_i)}}{\partial u}\right)^T \\ \frac{-f_o}{p}\left(\frac{\partial \rho_{u,s_j(\tau_j)}^T \dot{s}_j(\tau_j)}{\partial u} - \frac{\partial \rho_{u,s_1(\tau_j)}^T \dot{s}_1(\tau_j)}{\partial u}\right)^T \\ u^T \end{bmatrix}_{u=\hat{u}^{(l)}}^{-1} \begin{bmatrix} \tilde{d}_{i1}(\tau_i) - \frac{1}{p}\left(r_{\hat{u}^{(l)},s_i(\tau_i)} - r_{\hat{u}^{(l)},s_1(\tau_i)}\right) \\ \tilde{f}_{j1}(\tau_j) + \frac{f_o}{p}\left(\rho_{\hat{u}^{(l)},s_j(\tau_j)}^T \dot{s}_j(\tau_j) - \rho_{\hat{u}^{(l)},s_1(\tau_j)}^T \dot{s}_1(\tau_j)\right) \\ r_e^2 - \hat{u}^{(l)T}\hat{u}^{(l)} \end{bmatrix}$$

$$\hat{u}^{(l+1)} = \hat{u}^{(l)} + \Delta \hat{u}^{(l+1)} \quad (18)$$

until $|\Delta \hat{u}^{(l+1)}|$ is sufficiently small, for example 0.01 m, and $r_e$ is the earth radius around the location of the emitter 110. Equation (17) obtains the amount of correction of the emitter 110 location estimate in one embodiment. In practice, one to three iterations are sufficient in one embodiment. Equation (18) forms a better emitter 110 location estimate by adding the correction component computed from equation (17) to the solution.

III. FDOA-FDOA Solution $\hat{u}_{f_{21},f_{31}}$

The FDOA-FDOA solution follows the Taylor-series technique described by Foy, with initial solution guess selected from any one of the four: $\hat{u}_{d_{21},f_{21}}$, $\hat{u}_{d_{21},f_{31}}$, $\hat{u}_{d_{31},f_{21}}$ and $\hat{u}_{d_{31},f_{31}}$. Then, the initial solution guess selected is used as $\hat{u}^{(0)}$ in the Taylor-series technique described by Foy to improve the solution estimate by iterating for l=0, 1, 2, . . .

emitter's 110 true location can be found by combining estimates from the solutions $\hat{u}_{d_{21},d_{31}}$, $\hat{u}_{f_{21},f_{31}}$, $\hat{u}_{d_{21},f_{21}}$, $\hat{u}_{d_{21},f_{31}}$, $\hat{u}_{d_{31},f_{21}}$ and $\hat{u}_{d_{31},f_{31}}$ as described below.

Figure 6:
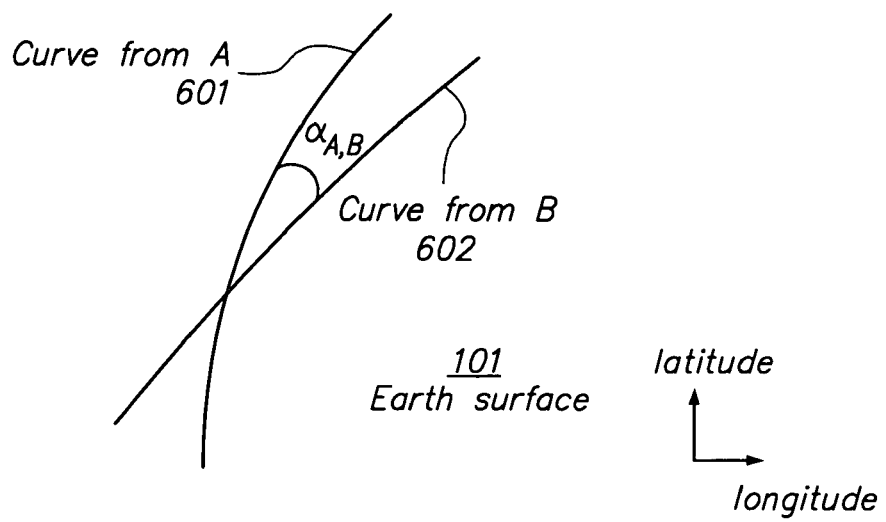
FIG. 6 illustrates an example of an angle of intersection of two curves on the earth's surface, in accordance with one embodiment.

Referring back to FIG. 4, in the next step 404 of the method 400, a weighting value for each solution is determined based on an intersection angle. As shown in FIG. 5A, each solution $\hat{u}_{d_{21},d_{31}}$, $\hat{u}_{d_{21},f_{21}}$, $\hat{u}_{d_{21},f_{31}}$, $\hat{u}_{d_{31},f_{21}}$, $\hat{u}_{d_{31},f_{31}}$, $\hat{u}_{f_{21},f_{31}}$ represents the point of intersection of two curves 5221, 5231, 5421, 5431. For each of the six individual solutions, the angle at which the two curves intersect on the earth's surface is determined. FIG. 6 illustrates an example of an angle of intersection of two curves 601, 602 on the earth's surface 101, in accordance with one embodiment. The intersection angle when using measurements A and B is denoted as $\alpha_{A,B}$, and it is the angle between 0 and 90 degrees. The weighting value for each solution, which are denoted $w_{A,B}$, are derived as a function of the angles $\alpha_{A,B}$. In one embodiment, the function relationship is such that the larger the intersection angle, the larger is the weighing value. In one embodiment, the weights also fulfill the condition that the sum of all six weights equals unity.

$$\Delta \hat{u}^{(l+1)} = \quad (19)$$

$$\begin{bmatrix} \frac{-f_o}{p}\left(\frac{\partial \rho_{u,s_2(t_c)}^T \dot{s}_2(t_c)}{\partial u} - \frac{\partial \rho_{u,s_1(t_c)}^T \dot{s}_1(t_c)}{\partial u}\right)^T \\ \frac{-f_o}{p}\left(\frac{\partial \rho_{u,s_3(t_d)}^T \dot{s}_3(t_d)}{\partial u} - \frac{\partial \rho_{u,s_1(t_d)}^T \dot{s}_1(t_d)}{\partial u}\right)^T \\ u^T \end{bmatrix}_{u=\hat{u}^{(l)}}^{-1} \begin{bmatrix} \tilde{f}_{21}(t_c) + \frac{f_o}{p}\left(\rho_{\hat{u}^{(l)},s_2(t_c)}^T \dot{s}_2(t_c) - \rho_{\hat{u}^{(l)},s_1(t_c)}^T \dot{s}_1(t_c)\right) \\ \tilde{f}_{31}(t_d) + \frac{f_o}{p}\left(\rho_{\hat{u}^{(l)},s_3(t_d)}^T \dot{s}_3(t_d) - \rho_{\hat{u}^{(l)},s_1(t_d)}^T \dot{s}_1(t_c)\right) \\ r_e^2 - \hat{u}^{(l)T}\hat{u}^{(l)} \end{bmatrix}$$

$$\hat{u}^{(l+1)} = \hat{u}^{(l)} + \Delta \hat{u}^{(l+1)} \quad (20)$$

until $|\Delta \hat{u}^{(l+1)}|$ is sufficiently small, for example 0.01 m, and $r_e$ is the earth radius around the location of the emitter 110. Equation (19) obtains the amount of correction of the emitter 110 location estimate in one embodiment. In practice, one to three iterations are sufficient in one embodiment. Equation (20) forms a better emitter 110 location estimate by adding the correction component computed from equation (19) to the solution.

Figure 7A:
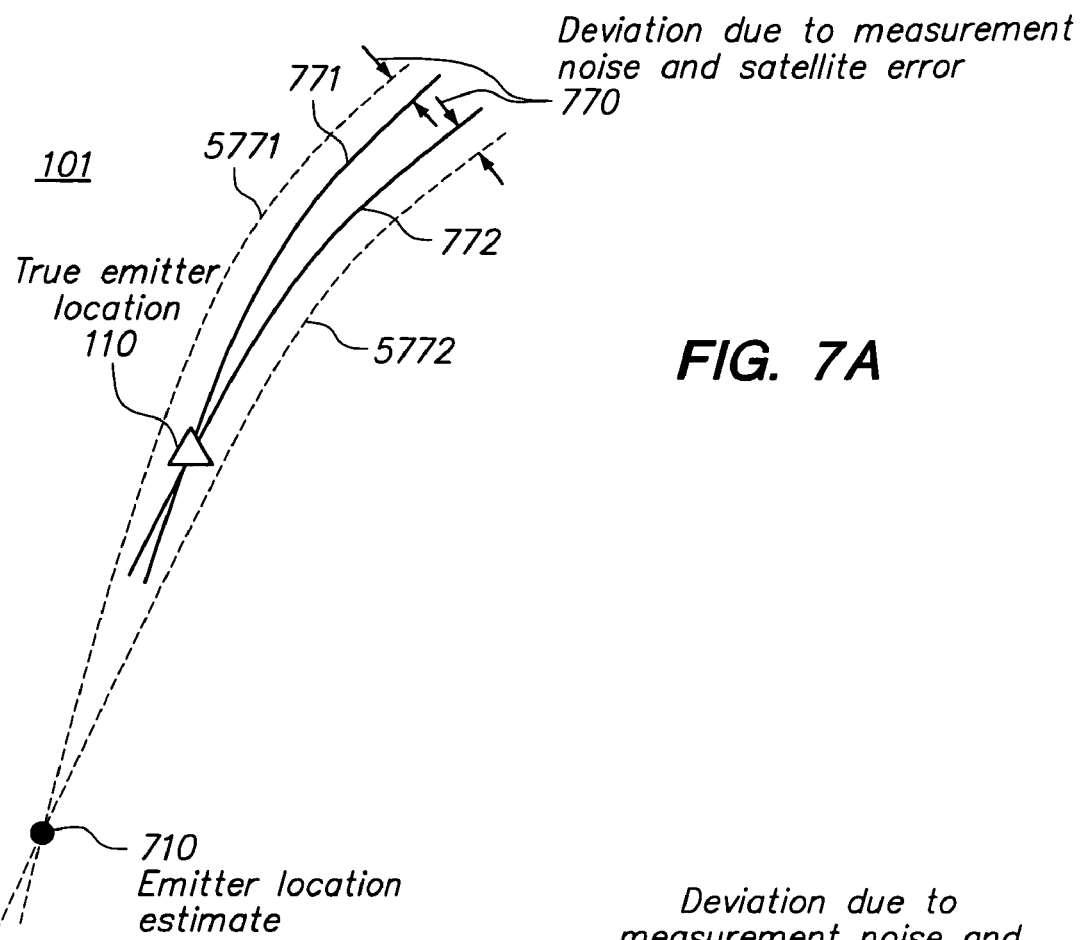
FIG. 7A illustrates an example of the deviation of an estimated location of an emitter from the true emitter location in the presence of measurement noise and satellite error for two curves, in accordance with one embodiment.
Figure 7B:
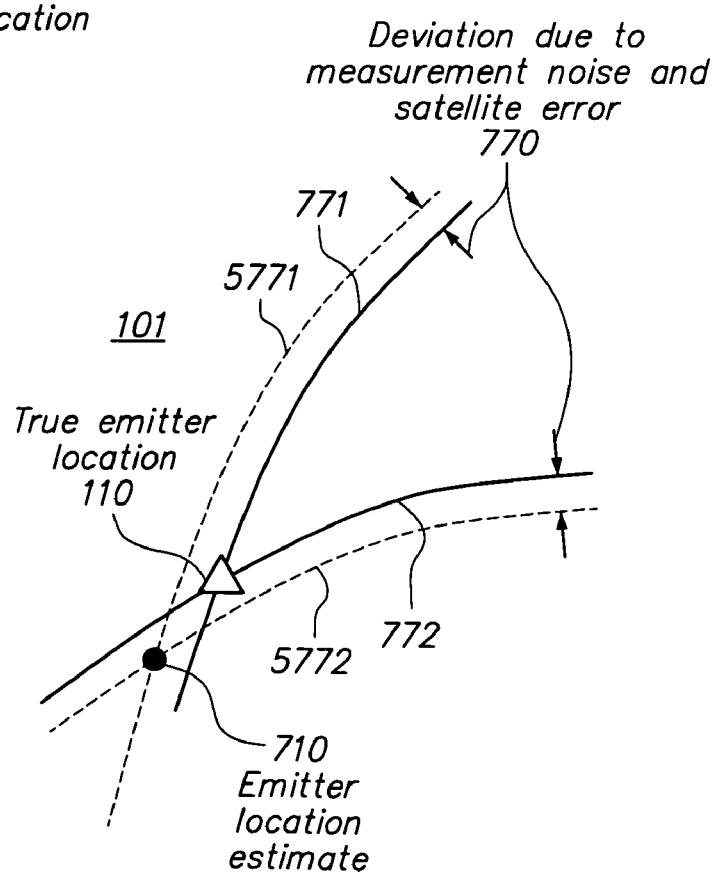
FIG. 7B illustrates another example of the deviation of an estimated location of an emitter from the true emitter location in the presence of measurement noise and satellite error for two curves, in accordance with one embodiment.

Any one of the six solutions $\hat{u}_{d_{21},d_{31}}$, $\hat{u}_{f_{21},f_{31}}$, $\hat{u}_{d_{21},f_{21}}$, $\hat{u}_{d_{21},f_{31}}$, $\hat{u}_{d_{31},f_{21}}$ and $\hat{u}_{d_{31},f_{31}}$ can be used as an estimate of the location of the unknown emitter 110. Because of errors in measurement, any one of the solutions may not be a perfectly accurate predictor of the unknown emitter's 110 true location, but it may be accurate enough for various applications of the invention. In other embodiments, a more accurate estimate of the The function relationship such that the larger the intersection angle, the larger the weighting value is explained with reference to FIGS. 7A and 7B. FIG. 7A shows an example of two curves 5771, 5772 that intersect at a small angle. FIG. 7B shows an example of two curves 5771, 5772 that intersect at a larger angle. The errors in the measurements as well as satellite positions and velocities perturb the curves 771 and 772 on the earth's surface such that they are measured as 5771 and 5772. Thus, whereas the true emitter location is at emitter 110, the estimate of the emitter location from the curves distorted by error is at location 710. This is due to the deviation caused by measurement and satellite error that can be depicted as the distance 770 between the curve 771 and curve 5771, and the distance 770 between the curve 772 and 5772. In the examples shown in FIGS. 7A and 7B, the deviation caused by measurement and satellite error 770 is the same for both curves 771 and 772. In other examples, the deviations may not be the same. Note that although the amount of deviation due to error 770 is the same for both FIGS. 7A and 7B, the effect on how far the emitter location estimate 710 is from the true emitter location 110 is much different between FIGS. 7A and 7B. As shown by these figures, the emitter location estimate 710 made by the two curves 5771 and 5772 that intersect at a large angle is closer to the true emitter location 110 than the emitter location estimate 710 made by two curves 5771 and 5772 that intersect at a small angle. As a result, more weight $w_{A,B}$ is given to solutions where angle $\alpha_{A,B}$ is larger to put more emphasis on the distances whose individual solutions have larger intersection angles.

There are many possible choices for weighting schemes that satisfy the general rule of function relationship being that the larger the intersection angle, the larger is the weighing value. For example, in one embodiment, let $\hat{u}_{A,B}$ be the individual emitter location estimate using measurements A and B, and let $\alpha_{A,B}$ be the intersection angle of the two curves created by measurements A and B on the earth surface. In various embodiments, possible choices of the weighting $w_{A,B}$ are $$w_{A,B} = \alpha_{A,B}$$

$$w_{A,B} = \sin(\alpha_{A,B})$$

$$w_{A,B} = \sin^2(\alpha_{A,B})$$

$$w_{A,B} = \sqrt{\sin(\alpha_{A,B})}$$

The choice of the weighting $w_{A,B}$ can depend upon the geolocation geometry, the noise powers in the TDOA and FDOA measurements, the amount of errors in the satellite positions and velocities in the measurements, and other factors.

Figure 5B:
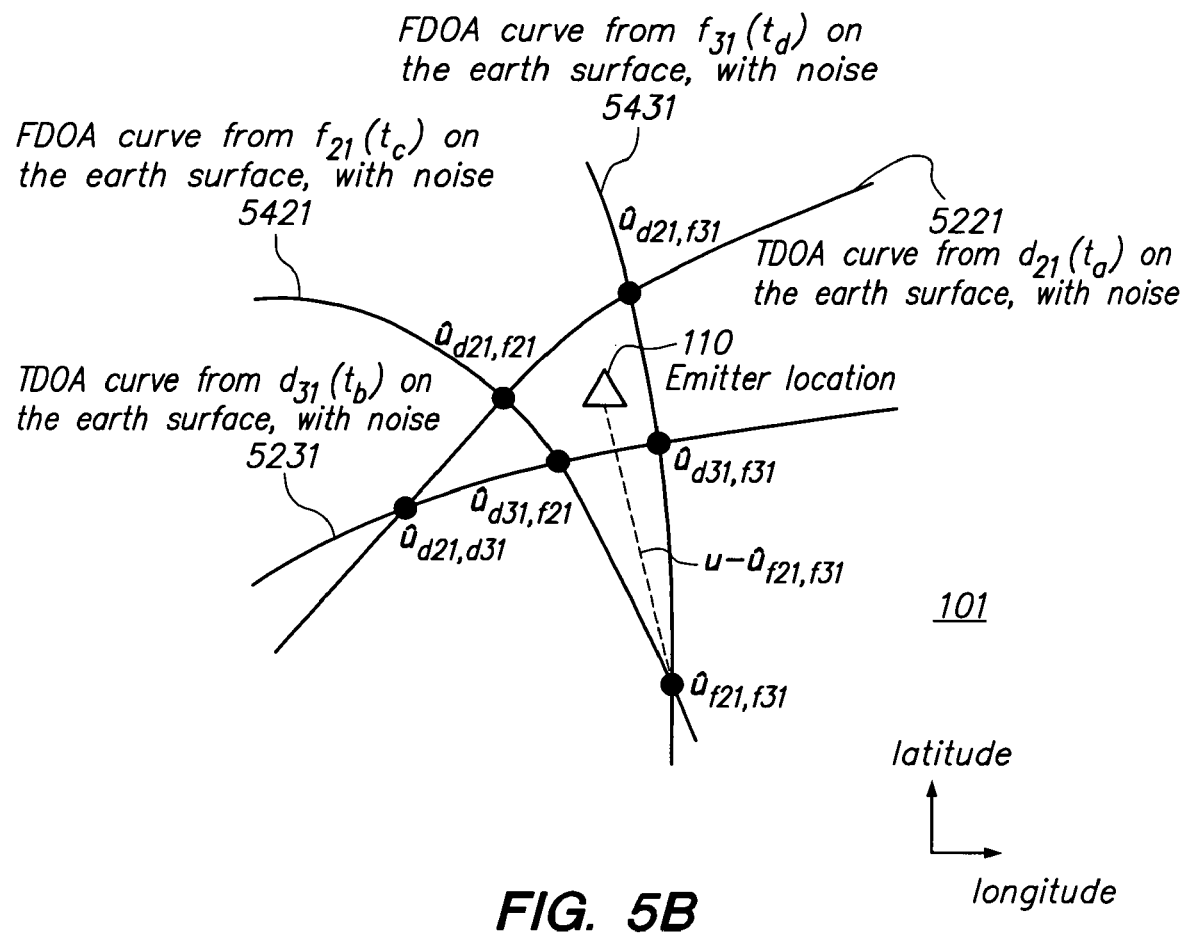
FIG. 5B illustrates the distance between an intersection point of two FDOA curves with noise and the actual emitter location, in accordance with one embodiment.

Referring again to FIG. 4, after the weighting value for each solution based on the intersection angle is determined in step 404 of the method 400, the solutions and weighting values are combined in step 406 to determine the cost function. The solutions and weighting values can be combined to determine the cost J from the cost function as follows:

$$J = w_{d_{21},d_{31}}|u-\hat{u}_{d_{21},d_{31}}|^2 + w_{d_{21},f_{21}}|u-\hat{u}_{d_{21},f_{21}}|^2 + w_{d_{21},f_{31}}|u-\hat{u}_{d_{21},f_{31}}|^2 + w_{d_{31},f_{21}}|u-\hat{u}_{d_{31},f_{21}}|^2 + w_{d_{31},f_{31}}|u-\hat{u}_{d_{31},f_{31}}|^2 + w_{f_{21},f_{31}}|u-\hat{u}_{f_{21},f_{31}}|^2 \quad (21)$$

where the weights $w_{A,B}$ are derived as a function of the angles $\alpha_{A,B}$, as described above. The squared absolute value terms are representative of the error between the solution found by two of the four TDOA and FDOA measurements. For example, FIG. 5B illustrates the distance between an intersection point $\hat{u}_{f_{21},f_{31}}$ of two FDOA curves with noise 5431, 5421 and the actual emitter location 110, in accordance with one embodiment. The expression $|u-\hat{u}_{f_{21},f_{31}}|^2$ is representative of the error between the solution of the two FDOA curves and the true emitter 110 location. Each of the weights for the solutions determined in step 404 are applied to the errors in the measurements of the solutions to determine the cost function in step 406.

In step 408, the cost function is minimized to determine the location of the unknown emitter 110. In other words, the value of u that minimizes the cost function is determined to be the location of the emitter 110. The determined location represents an estimate informed by all of the TDOA and FDOA measurements from the combinations of the three satellites $s_1$, $s_2$, and $s_3$. Thus, in one embodiment, a more accurate emitter position estimate is obtained from the six individual emitter position solutions from the four TDOA and FDOA measurements than would be achieved by considering a smaller subset of solutions.

The above description is included to illustrate the operation of the embodiments and is not meant to limit the scope of the invention. From the above discussion, many variations will be apparent to one skilled in the relevant art that would yet be encompassed by the spirit and scope of the invention. Those of skill in the art will also appreciate that the invention may be practiced in other embodiments. First, the particular naming of the components, capitalization of terms, the attributes, or structural aspect is not mandatory or significant, and the mechanisms that implement the invention or its features may have different names, formats, or protocols. Further, the system may be implemented via a combination of hardware and software or entirely in hardware elements. Also, the particular division of functionality between the various system components described herein is merely exemplary, and not mandatory; functions performed by a single system component may instead be performed by multiple components, and functions performed by multiple components may instead performed by a single component.

Certain aspects of the present invention include process steps and instructions described herein in the form of a method. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the methods described in the specification may be implemented by a single processor or be implemented in architectures employing multiple processor designs for increased computing capability.

The methods and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present invention is not described with reference to any particular programming language. It is appreciated that a variety of programming languages may be used to implement the teachings of the present invention as described herein.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A method of determining a geolocation of an emitter from two time-difference of arrival measurements from different times, the method comprising:
   determining a first time-difference of arrival at an observer between a first signal from the emitter relayed by a first satellite and the first signal relayed by a second satellite, wherein the first time-difference of arrival is observed at the observer at a first time;
   determining a second time-difference of arrival at the observer between a second signal from an emitter relayed by the first satellite and the second signal relayed by a third satellite, wherein the second time-difference of arrival is observed at the observer at a second time, the second time being different from the first time; and
   determining the geolocation of the emitter based on the first and second time-difference of arrivals, wherein the first satellite is at a first position at the first time and the first satellite is at a second position at the second time and wherein said determining the geolocation of the emitter based on the first and second time-difference of arrivals comprises defining a virtual satellite position as an average of the first and second positions of the first satellite and applying a closed-form solution to the first and second time-difference of arrivals using the virtual satellite position and positions of the second and third satellites.

2. The method of claim 1, further comprising:
   determining a first calibration factor from a third time-difference of arrival at the observer between a first calibration signal relayed by the first satellite and the first calibration signal relayed by the second satellite, wherein the third time-difference of arrival is observed at the observer at the first time;
   determining a second calibration factor from a fourth time-difference of arrival at the observer between a second calibration signal relayed by the first satellite and the second calibration signal relayed by the third satellite, wherein the fouth time-difference of arrival is observed at the observer at the second time;
   subtracting the first calibration factor from the first time-difference of arrival and the second calibration factor from the second time-difference of arrival to reduce effects of satellite position and velocity errors on the determined geolocation of the emitter.

3. The method of claim 1, wherein determining the geolocation of the emitter based on the first and second time-difference of arrivals comprises:
   applying a Taylor-series estimation to an initial estimate of the geolocation of the emitter based on a closed form solution to the first and second time-difference of arrivals.

4. The method of claim 1, further comprising calibrating the first and second time difference of arrivals prior to applying the closed form solution.

5. The method of claim 4, further comprising applying a Taylor-series estimation to an initial estimate of the geolocation of the emitter based on a closed form solution to the first and second time-difference of arrivals.

6. A method of determining a geolocation of an emitter, the method comprising:
   determining a first time-difference of arrival at an observer between a first signal from the emitter relayed by a first satellite and the first signal relayed by a second satellite, wherein the first time-difference of arrival is observed at the observer at a first time;
   determining a first frequency-difference of arrival at an observer between a second signal from the emitter relayed by the first satellite and the second signal relayed by a third satellite, wherein the first frequency-difference of arrival is observed at the observer at a second time, the second time being different from the first time; and
   determining the geolocation of the emitter based on the first time-difference of arrival and the first frequency-difference of arrival, wherein the first satellite is at a first position at the first time and the first satellite is at a second position at the second time and wherein said determining the geolocation of the emitter based on the first time-difference of arrival and the first frequency-difference of arrival comprises defining a virtual satellite position as an average of the first and second positions of the first satellite and applying a closed-form solution to the first time-difference of arrival and the first frequency-difference of arrival using the virtual satellite position and positions of the second and third satellites.

7. The method of claim 6, further comprising:
   determining a first calibration factor from a second time-difference of arrival at an observer between a first calibration signal relayed by the first satellite and the first calibration signal relayed by the second satellite, wherein the second time-difference of arrival is observed at the observer at the first time;
   determining a second calibration factor from a second frequency-difference of arrival at an observer between a second calibration signal relayed by the first satellite and the second calibration signal relayed by the third satellite, wherein the second frequency-difference of arrival is observed at the observer at the second time;
   subtracting the first calibration factor from the first time-difference of arrival and the second calibration factor from the first frequency-difference of arrival to reduce effects of satellite position and velocity errors on the determined geolocation of the emitter.

8. The method of claim 6, wherein determining the geolocation of the emitter based on the first time-difference of arrival and the first frequency-difference of arrival comprises:
   applying a Taylor-series estimation to an initial estimate of the geolocation of the emitter based on a closed form solution to the first time-difference of arrival and the first frequency-difference of arrival.

9. The method of claim 6, further comprising calibrating the first and second time difference of arrivals prior to applying the closed form solution.

10. The method of claim 9, further comprising applying a Taylor-series estimation to an initial estimate of the geolocation of the emitter based on a closed form solution to the first time-difference of arrival and the first frequency-difference of arrival.

11. A method of determining a geolocation of an emitter, the method comprising:
   determining a first time-difference of arrival at an observer between a first signal from the emitter relayed by a first satellite and the first signal relayed by a second satellite, wherein the first time-difference of arrival is observed at the observer at a first time;
   determining a first frequency-difference of arrival at an observer between a second signal from the emitter relayed by the first satellite and the second signal relayed by the second satellite, wherein the first frequency-difference of arrival is observed at the observer at a second time, the second time being different from the first time, and determining the geolocation of the emitter based on the first time-difference of arrival and the first frequency-difference of arrival, wherein the first satellite is at a first position at the first time and the first satellite is at a second position at the second time and wherein said determining the geolocation of the emitter based on the first time-difference of arrival and the first frequency-difference of arrival comprises defining a virtual satellite position as an average of the first and second positions of the first satellite and applying a closed-form solution to the first time-difference of arrival and the first frequency difference of arrival using the virtual satellite position and positions of the second satellite at the first and second times.

12. The method of claim 11, further comprising:

determining a first calibration factor from a second time-difference of arrival at an observer between a first calibration signal relayed by the first satellite and the first calibration signal relayed by the second satellite, wherein the second time-difference of arrival is observed at the observer at the first time;

determining a second calibration factor from a second frequency-difference of arrival at an observer between a second calibration signal relayed by the first satellite and the second calibration signal relayed by the second satellite, wherein the second frequency-difference of arrival is observed at the observer at the second time;

subtracting the first calibration factor from the first time-difference of arrival and the second calibration factor from the first frequency-difference of arrival to reduce effects of satellite position and velocity errors on the determined geolocation of the emitter.

13. The method of claim 11, wherein determining the geolocation of the emitter based on the first time-difference of arrival and the first frequency-difference of arrival comprises:

applying a Taylor-series estimation to an initial estimate of the geolocation of the emitter based on a closed form solution to the first time-difference of arrival and the first frequency-difference of arrival.

14. A method of determining a geolocation of an emitter relayed to an observer through at least three satellites, the method comprising:

determining a first time-difference of arrival at the observer between a first signal relayed by a first satellite and the first signal relayed by a second satellite;

determining a second time-difference of arrival at the observer between a second signal relayed by the first satellite and the second signal relayed by a third satellite;

determining a first frequency-difference of arrival at the observer between a third signal relayed by the first satellite and the third signal relayed by the second satellite;

determining a second frequency-difference of arrival at the observer between a fourth signal relayed by the first satellite and the fourth signal relayed by the third satellite;

determining a first solution from the first time-difference of arrival and the second time difference of arrival;

determining a second solution from the first time-difference of arrival and the first frequency-difference of arrival;

determining a third solution from the first time-difference of arrival and the second frequency-difference of arrival;

determining a fourth solution from the second time-difference of arrival and the first frequency-difference of arrival;

determining a fifth solution from the second time-difference of arrival and the second frequency-difference of arrival;

determining a sixth solution from the first frequency-difference of arrival and the second frequency-difference of arrival; and determining the geolocation of the emitter based on the first solution, second solution, third solution, fourth solution, fifth solution and sixth solution, wherein each of the first through sixth solutions uses a combination of two of the time- or frequency-difference of arrivals and wherein the first satellite has a first position and a second position corresponding to each combination and further wherein said steps of determining the first through fifth solutions each comprises defining a virtual satellite position as an average of the first and second positions of the first satellite and applying a closed-form solution using the virtual satellite position and positions of the second and third satellites.

15. The method of claim 14, wherein determining the geolocation of the emitter comprises minimizing a cost function of the first solution, second solution, third solution, fourth solution, fifth solution, and sixth solution.

16. The method of claim 15, wherein the first time-difference of arrival, the second time difference of arrival, the first frequency difference of arrival, and the second frequency difference of arrival each define a corresponding curve, and wherein each solution of the first solution, second solution, third solution, fourth solution, fifth solution, and sixth solution is located at an intersection of two of the corresponding curves, and wherein each solution of the first solution, second solution, third solution, fourth solution, fifth solution, and sixth solution is weighted by a weight value determined as a function of an angle of intersection of the two curves at which the solution is located to form the cost function.

17. The method of claim 16, wherein each angle of intersection is between zero and ninety degrees and the weight value corresponding to a solution located at an intersection of two curves having a larger angle of intersection is larger than the weight value corresponding to a solution located at an intersection of two curves having a smaller angle of intersection.

18. The method of claim 14, further comprising calibrating each of the time- and frequency-difference of arrivals prior to the steps of determining the first through sixth solutions.

19. The method of claim 18, wherein each of the steps of determining the first through sixth solutions further comprises applying a Taylor-series estimation to an initial estimate of the geolocation of the emitter.

20. A computer program product for determining a geolocation of an emitter from two time-difference of arrival measurements from different times, the computer program product stored on a computer readable medium and adapted to perform the operations of:

determining a first time-difference of arrival at an observer between a first signal from the emitter relayed by a first satellite and the first signal relayed by a second satellite, wherein the first time-difference of arrival is observed at the observer at a first time;

determining a second time-difference of arrival at the observer between a second signal from an emitter relayed by the first satellite and the second signal relayed by a third satellite, wherein the second time-difference of arrival is observed at the observer at a second time, the second time being different from the first time; and determining the geolocation of the emitter based on the first and second time-difference of arrivals, wherein the first satellite is at a first position at the first time and the first satellite is at a second position at the second time and wherein said determining the geolocation of the emitter based on the first and second time-difference of arrivals comprises defining a virtual satellite position as an average of the first and second positions of the first satellite and applying a closed-form solution to the first and second time-difference of arrivals using the virtual satellite position and positions of the second and third satellites.

21. A computer program product for determining a geolocation of an emitter; the computer program product stored on a computer readable medium and adapted to perform the operations of:

determining a first time-difference of arrival at an observer between a first signal from the emitter relayed by a first satellite and the first signal relayed by a second satellite, wherein the first time-difference of arrival is observed at the observer at a first time;

determining a first frequency-difference of arrival at an observer between a second signal from the emitter relayed by the first satellite and the second signal relayed by a third satellite, wherein the first frequency-difference of arrival is observed at the observer at a second time, the second time being different from the first time; and determining the geolocation of the emitter based on the first time-difference of arrival and the first frequency-difference of arrival, wherein the first satellite is at a first position at the first time and the first satellite is at a second position at the second time and wherein said determining the geolocation of the emitter based on the first time-difference of arrival and the first frequency-difference of arrival comprises defining a virtual satellite position as an average of the first and second positions of the first satellite and applying a closed-form solution to the first time-difference of arrival and the first frequency-difference of arrival using the virtual satellite position and positions of the second and third satellites.

22. A computer program product for determining a geolocation of an emitter, the computer program stored on a computer readable medium and adapted to perform the operations of:

determining a first time-difference of arrival at an observer between a first signal from the emitter relayed by a first satellite and the first signal relayed by a second satellite, wherein the first time-difference of arrival is observed at the observer at a first time;

determining a first frequency-difference of arrival at an observer between a second signal from the emitter relayed by the first satellite and the second signal relayed by the second satellite, wherein the first frequency-difference of arrival is observed at the observer at a second time, the second time being different from the first time, and determining the geolocation of the emitter based on the first time-difference of arrival and the first frequency-difference of arrival, wherein the first satellite is at a first position at the first time and the first satellite is at a second position at the second time and wherein said determining the geolocation of the emitter based on the first time-difference of arrival and the first frequency-difference of arrival comprises defining a virtual satellite position as an average of the first and second positions of the first satellite and applying a closed-form solution to the first time-difference of arrival and the first frequency difference of arrival using the virtual satellite position and positions of the second satellite at the first and second times.

23. A computer program product for determining a geolocation of an emitter relayed to an observer through at least three satellites, the computer program product stored on a computer readable medium and adapted to perform the operations of:

determining a first time-difference of arrival at the observer between a first signal relayed by a first satellite and the first signal relayed by a second satellite;

determining a second time-difference of arrival at the observer between a second signal relayed by the first satellite and the second signal relayed by a third satellite;

determining a first frequency-difference of arrival at the observer between a third signal relayed by the first satellite and the third signal relayed by the second satellite;

determining a second frequency-difference of arrival at the observer between a fourth signal relayed by the first satellite and the fourth signal relayed by the third satellite;

determining a first solution from the first time-difference of arrival and the second time difference of arrival;

determining a second solution from the first time-difference of arrival and the first frequency-difference of arrival;

determining a third solution from the first time-difference of arrival and the second frequency-difference of arrival;

determining a fourth solution from the second time-difference of arrival and the first frequency-difference of arrival;

determining a fifth solution from the second time-difference of arrival and the second frequency-difference of arrival;

determining a sixth solution from the first frequency-difference of arrival and the second frequency-difference of arrival; and determining the geolocation of the emitter based on the first solution, second solution, third solution, fourth solution, fifth solution and sixth solution, wherein each of the first through sixth solutions uses a combination of two of the time- or frequency-difference of arrivals and wherein the first satellite has a first position and a second position corresponding to each combination and further wherein said steps of determining the first through fifth solutions each comprises defining a virtual satellite position as an average of the first and second positions of the first satellite and applying a closed-form solution using the virtual satellite position and positions of the second and third satellites.

24. The computer program product of claim 23, wherein determining the geolocation of the emitter comprises minimizing a cost function of the first solution, second solution, third solution, fourth solution, fifth solution, and sixth solution.

25. The computer program product of claim 24, wherein the first time-difference of arrival, the second time difference of arrival, the first frequency difference of arrival, and the second frequency difference of arrival each define a corresponding curve, and wherein each solution of the first solution, second solution, third solution, fourth solution, fifth solution, and sixth solution is located at an intersection of two of the corresponding curves, and wherein each solution of the first solution, second solution, third solution, fourth solution, fifth solution, and sixth solution is weighted by a weight value determined as a function of an angle of intersection of the two curves at which the solution is located to form the cost function.

26. The computer program product of claim 25, wherein each angle of intersection is between zero and ninety degrees and the weight value corresponding to a solution located at an intersection of two curves having a larger angle of intersection is larger than the weight value corresponding to a solution located at an intersection of two curves having a smaller angle of intersection.

* * * * *